United States Patent
Freund et al.

(10) Patent No.: US 8,080,803 B2
(45) Date of Patent: Dec. 20, 2011

(54) DETECTOR MODULE, RADIATION DETECTOR AND RADIATION RECORDING DEVICE

(75) Inventors: Andreas Freund, Heroldsbach (DE); Peter Hackenschmied, Nurernberg (DE); Peter Kämmerer, Schnaittach (DE); Claus Pohan, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 457 days.

(21) Appl. No.: 12/222,698

(22) Filed: Aug. 14, 2008

(65) Prior Publication Data
US 2009/0045347 A1 Feb. 19, 2009

(30) Foreign Application Priority Data
Aug. 17, 2007 (DE) .......................... 10 2007 038 980

(51) Int. Cl.
*H01L 27/146* (2006.01)
*G01T 1/24* (2006.01)
*G01N 23/00* (2006.01)
*G21K 1/02* (2006.01)

(52) U.S. Cl. ......... 250/370.09; 250/370.12; 250/370.13; 378/19; 378/147

(58) Field of Classification Search ............. 250/370.09, 250/370.12, 370.13; 378/19, 147
See application file for complete search history.

(56) References Cited

U.S. PATENT DOCUMENTS

| 4,136,281 A * | 1/1979 | Murray ...................... 250/336.1 |
| 7,486,764 B2 * | 2/2009 | Tkaczyk et al. ................ 378/19 |
| 2003/0150994 A1 * | 8/2003 | Freund et al. ................. 250/368 |
| 2004/0065839 A1 * | 4/2004 | Elgali ....................... 250/370.11 |
| 2005/0105691 A1 * | 5/2005 | Ikhlef ........................... 378/147 |
| 2005/0161608 A1 * | 7/2005 | Heismann ................ 250/370.09 |
| 2005/0236574 A1 * | 10/2005 | Von Der Haar .......... 250/370.09 |
| 2005/0277542 A1 | 12/2005 | Kaminsky et al. |
| 2006/0278832 A1 * | 12/2006 | Zentai et al. ............. 250/370.09 |
| 2007/0121781 A1 | 5/2007 | Hoffman et al. |

FOREIGN PATENT DOCUMENTS

WO WO 2006/018767 A2 2/2006

* cited by examiner

*Primary Examiner* — David Porta
*Assistant Examiner* — Mindy Vu
(74) *Attorney, Agent, or Firm* — Harness, Dickey & Pierce, P.L.C.

(57) ABSTRACT

A detector module is disclosed including a plurality of directly converting detector submodules, each with a back contact, and a scattered radiation collimator spanning the detector submodules. For contacting the back contacts, a contacting unit is provided in at least one embodiment and designed so that a contact connection is established between the contacting unit and the counter-electrodes by way of assembly-related proximity of the scattered radiation collimator and the counter-electrodes.

20 Claims, 4 Drawing Sheets

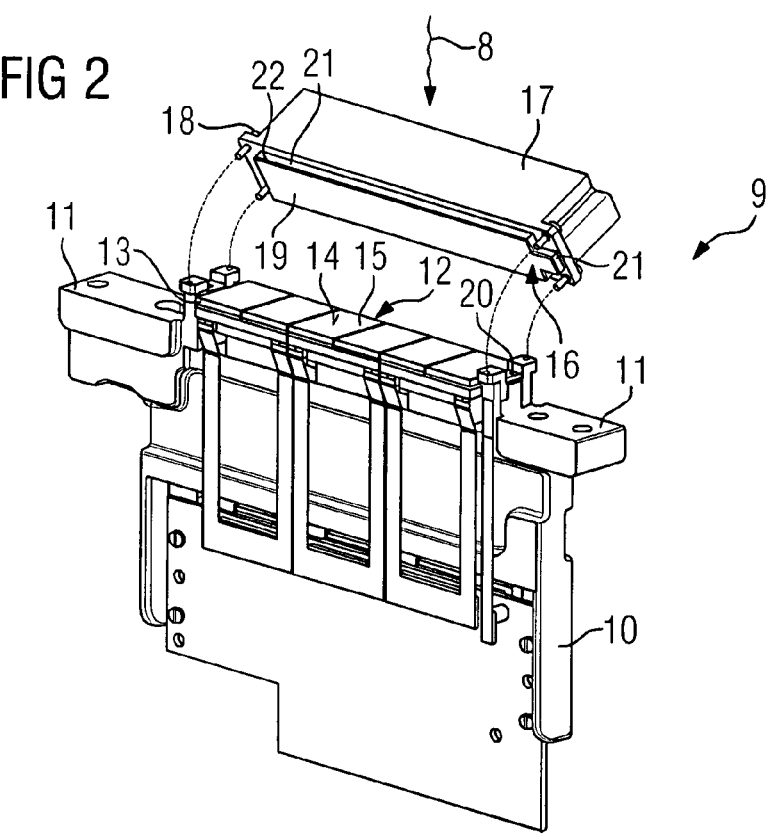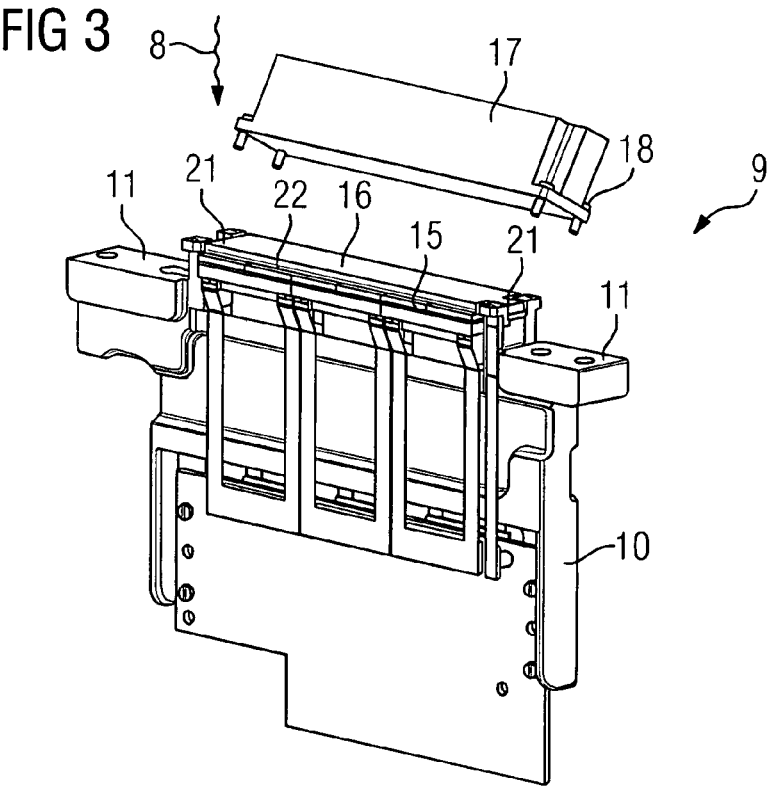

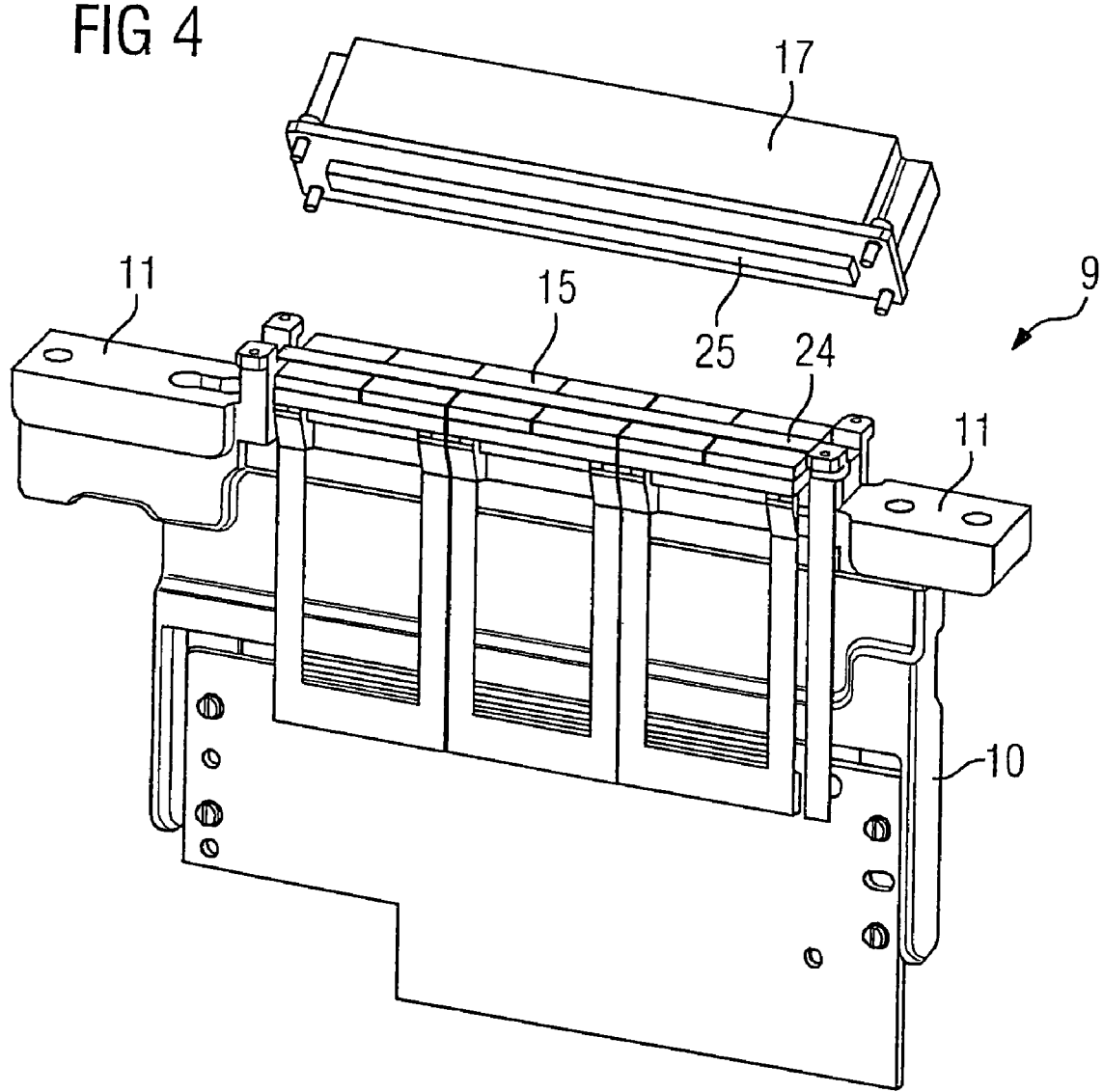

DETECTOR MODULE, RADIATION DETECTOR AND RADIATION RECORDING DEVICE

PRIORITY STATEMENT

The present application hereby claims priority under 35 U.S.C. §119 on German patent application number DE 10 2007 038 980.0 filed Aug. 17, 2007, the entire contents of which is hereby incorporated herein by reference.

FIELD

Embodiments of the invention generally relate to a detector module; and relate more specifically to a detector module for producing a directly converting radiation detector, to a radiation detector including at least one detector module, and/or to a radiation recording device comprising the radiation detector.

BACKGROUND

For the recording of X- or gamma radiation, for example in X-ray computer tomography systems, so-called directly converting radiation detectors are known. Such radiation detectors generally comprise a plurality of detector modules, by which X-radiation is converted into electrical signals in a one-stage interaction process. To distinguish the terminology in this context, scintillator photodiode detectors for example are to be mentioned by which the radiation is converted into electrical signals in a two-stage interaction process: in a first interaction process, the radiation is converted into light by means of a scintillator. The light is in turn converted into electrical signals in a second interaction process by way of photodiodes.

Known directly converting detector modules include for example a plurality of detector submodules arranged successively in the manner of tiles, which include a converter layer made of a semiconductor material. Charges, specifically electron-hole pairs, are generated by interaction of the radiation with the semiconductor material i.e. by quantum absorption events. For spatially resolved recording of the charges, and therefore of the quantum absorption events, a multiplicity of pixel electrodes are provided on a first side of the converter layer and a counter-electrode or cover electrode is provided on a second side opposite to the first side, a voltage being applied between the counter-electrode and the pixel contacts. The counter-electrode or cover electrode is also known by the term back contact.

The voltage generates electrical fields in the converter layer, by which the charges are separated and—according to the type of charge—accelerated to the counter-electrode or to the pixel electrodes. The charges moved in this way induce currents on the corresponding electrodes, which can be recorded as electrical signals. With the aid of the electrical signals, it is possible to determine for example an attenuation image of an object to be examined.

In such detector modules, it is thus necessary to supply the electrodes with the corresponding voltage. This is problematic in several regards: it is necessary to ensure that the voltage supply to all the electrodes is of consistent quality. A difficulty with this is that a scattered radiation collimator is generally arranged on the counter-electrode side of the detector module. The scattered radiation collimator impedes accessibility to the counter-electrodes, so that the technical possibilities for contacting the counter-electrodes are significantly restricted. Since the voltage may lie in the kilovolt range, it is likewise desirable to ensure sufficient electrical insulation from other components of the radiation detector.

SUMMARY

In at least one embodiment of the invention, a detector module is provided, with which at least one of the problems according to the prior art are resolved in a straightforward way, particularly in design terms. In at least one embodiment, a detector module is provided which allows high-quality and readily achievable contacting of the counter-electrodes. The intention is furthermore to provide a detector module in which the contacting of the counter-electrodes is configured so that subcomponents of the detector module can be replaced without problems. In at least one other embodiment, a radiation detector and a radiation recording device is provided.

A first aspect of at least one embodiment of the invention relates to a detector module for producing a directly converting radiation detector. The irradiation may in particular be X- or gamma radiation. The detector module includes a plurality of detector submodules arranged successively, for example in the manner of tiles. Each detector submodule comprises a multiplicity of detector pixels or image point elements.

Each detector submodule includes a multiplicity of pixel electrodes on a first side of the detector module. The pixel electrodes correspond essentially to the detector pixels. On a second side opposite to the first side, opposite the pixel electrodes, each detector submodule respectively includes a counter-electrode. The counter-electrodes are also referred to as so-called "back contacts".

The detector module of at least one embodiment furthermore includes a scattered radiation collimator which spans the detector submodules in the manner of a bridge and is fitted on the counter-electrode side.

A contacting unit is provided between the scattered radiation collimator and the counter-electrodes. The contacting unit is electrically conductively connected to one or more, i.e. at least one, voltage-supplying contacting site.

The contacting unit is provided and designed so that at least one contact connection is established between the contacting unit and the counter-electrodes of a detector module by way of assembly-related proximity of the scattered radiation collimator and the counter-electrodes.

Here, "by way of assembly-related proximity" is to be understood as meaning that the contact connection is substantially necessarily established concomitantly with the assembly of the detector module, in particular mounting the scattered radiation collimator on the detector submodules. This means in particular that the contacting unit and counter-electrodes are pressed together. The contacting unit is preferably configured so that without further measures, apart from mounting the scattered radiation collimator, a contact pressure which ensures optimal electrical contacting of the contacting site to the counter-electrodes is produced between the counter-electrodes and the contacting unit.

If the contacting unit is configured as an independent unit, for example mechanically separately from the scattered radiation collimator and the detector submodules, the contact pressure furthermore causes clamping retention of the contacting unit. As an alternative to the previous configuration, the contacting unit may be formed in an integral design with the scattered radiation collimator, in which case the contacting unit may be connected to the scattered radiation collimator for example by a force, form or material fit.

It is thus clear that the counter-electrodes in the detector module according to at least one embodiment of the invention can be contacted in a straightforward way. In particular, the counter-electrodes can be contacted with consistent quality to the contacting unit.

One or more contacting sites may be provided for the voltage supply of the contacting unit. Their number may for example be selected as a function of the size and total number of detector submodules, so that optimal electrical contacting of the counter-electrodes can be achieved for respective situations. Contact elements such as contact pins, plug-in contacts and/or contact surfaces, contact pads and the like may be provided for electrical connection of the contacting site to the contacting unit.

The contacting unit may include an in particular flexible contacting layer which is electrically conductive at least on the counter-electrode side, and which is pressed onto the counter-electrodes by way of the scattered radiation collimator. The use of a contacting layer has the advantage of simple handling and ease of assembly. Furthermore, maximally large-area contact can be achieved between the contacting unit and the counter-electrodes. The contacting unit may include a contacting substrate designed conductively at least on the counter-electrode side. For electrical insulation of the scattered radiation collimator or other components of the detector module or components connected thereto from the contacting unit, the contacting substrate may include a substrate layer made of an electrical insulating material on the collimator side. With this configuration, the substrate layer may for example have metallization applied on the counter-electrode side. Coating with copper may for example be envisaged as metallization.

It is also possible for the contacting layer to be made of an insulating material filled with conductive particles. For electrical insulation of the scattered radiation collimator from the contacting unit, the insulating material may be filled with the particles only in a restricted layer region on the counter-electrode side. The insulating material may be made of a flexible, compressible material. In particular resilient polymer materials, plastics such as polyimides and the like, as well as latex materials or rubber may be envisaged. The substrate layer may also be designed in the form of a foam of the aforementioned or other materials. The foam may be applied onto the side of the scattered radiation collimator facing the counter-electrodes. An integral design may thereby be implemented straightforwardly in manufacturing technology, so that in particular the subsequent assembly of the detector module is simplified.

To improve the quality of the electrical contacts at least between the contacting unit and the counter-electrodes, a pressing element producing a contact pressure may be provided, by which the contacting unit is pressed onto the counter-electrodes. The contact pressure may in this case be produced by spring force, for example by way of springs or spring elements. The springs or spring elements may be provided between the scattered radiation collimator and the contacting unit.

Instead of the contacting layer or in addition to the contacting layer, the contacting unit may include a number of resilient contact tabs corresponding at least to the number of counter-electrodes, which project in the direction of the counter-electrodes. The contact tabs are in this case provided and designed so that they are pressed onto respectively assigned counter-electrodes by means of the assembly-related proximity of the scattered radiation collimator and the counter-electrodes. The effect achievable by such contact tabs is that all the counter-electrodes are contacted with equal quality.

A second aspect of an embodiment of the invention relates to a radiation detector having at least one detector module according to the first aspect of an embodiment of the invention. A third aspect of an embodiment of the invention relates to a radiation recording device, in particular an X-ray computer tomography device having at least one radiation detector according to the second aspect. Advantages and advantageous effects of the radiation detector and the radiation recording unit derive directly from the advantages and advantageous effects of the detector module according to an embodiment of the invention. It is thus possible to achieve in particular high-quality contacting of the counter-electrodes which is particularly simple in assembly technology.

BRIEF DESCRIPTION OF THE DRAWINGS

The invention will be explained in more detail below with the aid of example embodiments and figures, in which:

FIG. 2 shows a first configuration of a detector module according to the first aspect of an embodiment of the invention;

FIG. 3 shows a second configuration of a detector module according to the first aspect of an embodiment of the invention;

FIG. 4 shows a third configuration of a detector module according to the first aspect of an embodiment of the invention;

DETAILED DESCRIPTION OF THE EXAMPLE EMBODIMENTS

Figure 1:
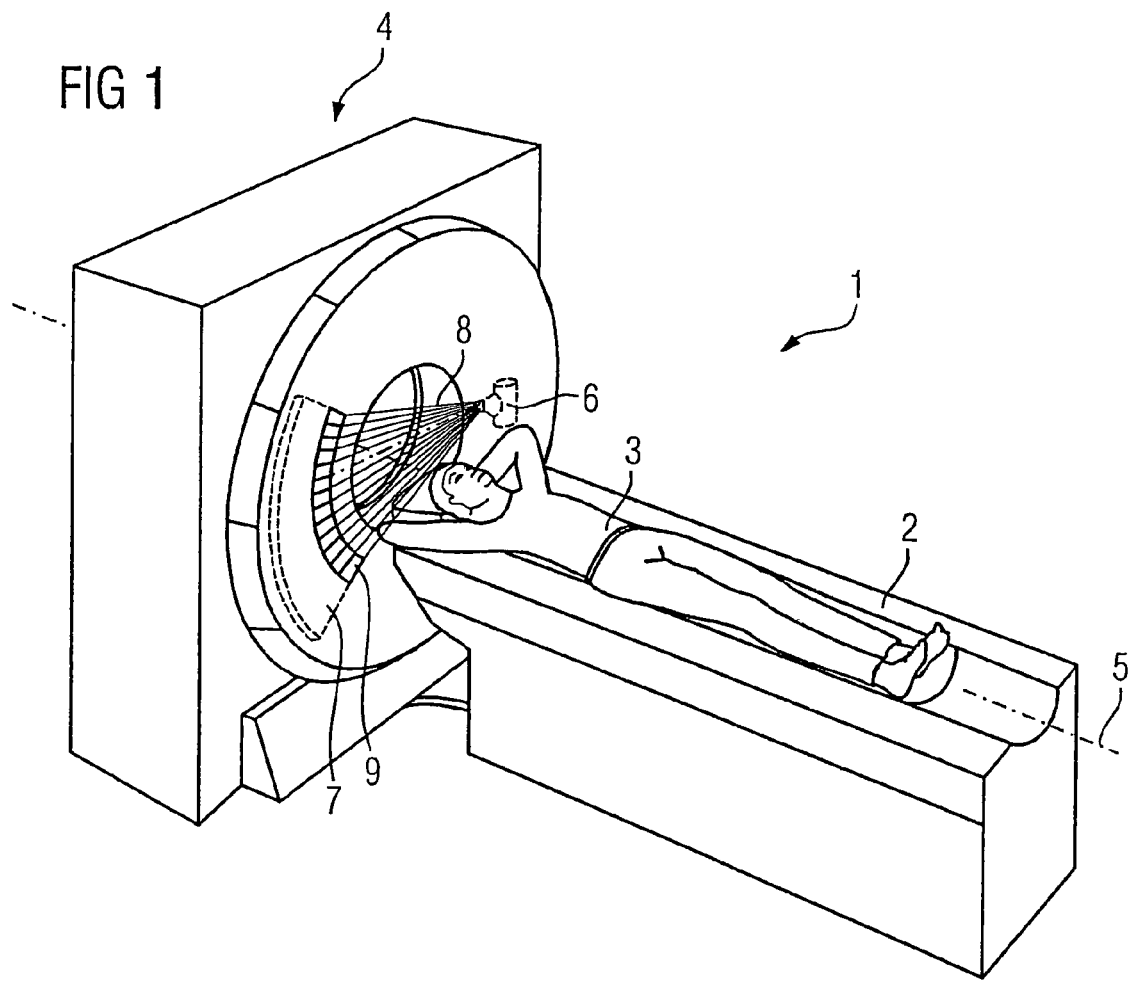
FIG. 1 shows an X-ray computer tomography apparatus according to the third aspect of an embodiment of the invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Throughout the figures, elements which are the same or have the same function are denoted by the same reference numerals. The representations in the figures are schematic and not necessarily true to scale, and scales may vary between the figures. The X-ray computer tomograph and the X-ray detector will be discussed below only as far as is deemed necessary in order to understand embodiments of the invention.

FIG. 1 shows an X-ray computer tomography apparatus 1 according to the third aspect of the invention. The X-ray computer tomography apparatus 1 includes a patient support table 2 for supporting a patient 3 to be examined. The X-ray computer tomography apparatus 1 furthermore includes a gantry 4, the housing of which contains a tube-detector system mounted so that it can rotate about a system axis 5. The tube-detector system includes an X-ray tube 6, and an X-ray detector 7 arranged opposite the latter. During operation, the X-ray tube 6 emits X-radiation 8 in the direction of the X-ray detector 7, which can be recorded by way of the X-ray detector 7. The X-ray detector 7 includes a plurality of detector modules 9 according to the first aspect of the invention. The detector modules 9 are direct converter modules by which the X-radiation 8 is converted directly, i.e. in a one-stage interaction process, into electrical signals.

FIG. 2 shows a first configuration of the detector module 9 in a partly exploded representation. The detector module 9 includes a support 10, on which mounting surfaces 11 are provided for mounting the detector module 9 on a frame (not shown) of the X-ray detector 7. A total of six detector submodules 12 are fitted successively on a bar of the support 10, which connects the mounting surfaces 11. It is to be pointed out that the number and arrangement of the detector submodules 12 may differ from FIG. 2. In particular, the detector submodules 12 may for example be arranged next to one another in the manner of tiles in two dimensions.

Each detector submodule 12 includes a converter layer 13 made of a semiconductor material for converting the X-radiation 8 into electrical charges. In order to record the electrical charges in the form of electrical signals, a multiplicity of pixel electrodes (not shown) are provided on a lower side of the converter layer 13 and a counter-electrode 15 is provided on an upper side 14 of the converter layer 13. Electrical charges are generated in the converter layer 13 by quantum absorption events. Owing to the electrical charges as a result of an electrical voltage applied between the counter-electrode 15 and the pixel electrodes, electrical currents or signals are induced on the electrodes. With the aid of the electrical signals, it is possible to determine for example the number and/or energy of quanta of the X-radiation 8 absorbed in the converter layer, and on the basis of this an attenuation image. With respect to the function, reference is also made to the introductory description.

The counter-electrode 15 may for example be a metallization of the upper side 14 of the converter layer 13. So that the X-radiation 8 can be recorded effectively and accurately, it is necessary for voltage to be supplied with equal quality to all the counter-electrodes 15 of the detector submodules 12. To this end, in particular, it is necessary to contact the counter-electrodes 15 with a voltage supply 20. There are in principle many conceivable possibilities for contacting the individual counter-electrodes 15. According to an embodiment of the invention, the contacting of the counter-electrodes 15 is achieved by a contacting unit 16 which is arranged between the upper side 14 and a scattered radiation collimator 17 connected in front of the detector submodules 12 on the counter-electrode side.

When the scattered radiation collimator 17 is being mounted, it is fastened on the support 10 by way of screws 18. The contacting unit 16 is thereby pressed with its contact side 19 onto the upper side 14 of the counter-electrodes 15. The pressing force, with which the contact side 19 is pressed onto the counter-electrodes 15, depends here for example on the thickness of the contacting unit 16 and the type of fastening of the scattered radiation collimator 17 on the support 10. By suitable selection for example of the thickness and type of the fastening, such as screws, latch elements etc., it is readily possible to achieve optimal electrical contact for respective design situations. In other words, this means that the contacting unit 16 is provided and designed so that at least one contact connection is established between the contacting unit 16 and the counter-electrodes 15 by way of assembly-related proximity of the scattered radiation collimator 17 and the counter-electrodes 15.

The contacting unit 16 represented in FIG. 2 may for example include a conductive rubber. The conductive rubber has an insulator layer 21 facing the scattered radiation collimator 17 and a conducting layer 22 facing the counter-electrodes 15, i.e. on the contact side 19. Instead of using a rubber, it is also possible to use any other, in particular foamed polymer or plastic material, for example polyimide, latex etc. The in particular foamed material may be provided on the contact side 19 with a metallization, for example of copper, which forms the conducting layer 22. As an alternative to this, it is also possible to fill the material with conductive particles so as to achieve a layer structure, corresponding to the previous configuration, with an insulator layer 21 and a conducting layer 22.

The contacting of the contacting unit 16 with the voltage supply 20 is carried out in the present case via a contact lug which protrudes from the main body of the conductive rubber, is pressed onto the voltage supply 20 by way of the scattered radiation collimator 17 and is brought in contact therewith. As an alternative to this, two or more contact lugs 21 may also be provided. Instead of the contact lugs 21, it is also possible to provide other contacting devices, for example contact pins, plug-in connections, contact pads and the like.

Advantages of the detector module are clear: as already mentioned, consistent-quality contacting of the counter-electrodes 15 can be achieved. The contacting according to an embodiment of the invention is furthermore particularly simple to implement in terms of manufacturing and assembly technology. The contacting according to an embodiment of the invention also allows simple, replacement, for example of an individual detector submodule 12. These advantages may also be achieved similarly with alternative configurations, which will be discussed in more detail in FIG. 3 to FIG. 6.

In the first configuration as shown in FIG. 2 the contacting unit 16 is fitted on the scattered radiation collimator 17, i.e. the scattered radiation collimator 17 and the contacting unit 16 are configured in an integral design. Conversely, according to a second configuration, it is also possible for the contacting unit 16 to be designed as a separate unit. A contacting unit 16 designed in this way can be applied onto the counter-electrodes 15 when the detector module is being assembled. The contacting unit 16 can subsequently be pressed with a sufficient contact pressure by fitting the scattered radiation collimator 17 onto the counter-electrodes 15, and thereby simultaneously fixed. The second configuration is represented in FIG. 3.

A third configuration of the detector module 9 is represented in FIG. 4. Basically, the structure of the third configuration does not differ from the first and second configurations. The exception is the contacting unit 16. In the third configuration, this includes a band-like flat conductor 24 and a foamed strip 25 corresponding to the flat conductor 24. The flat conductor 24 is placed onto the counter-electrodes 15. The flat conductor 24 is pressed onto the counter-electrodes 15 by way of the foamed strip 25 fitted on the scattered radiation collimator 17.

Figure 5:
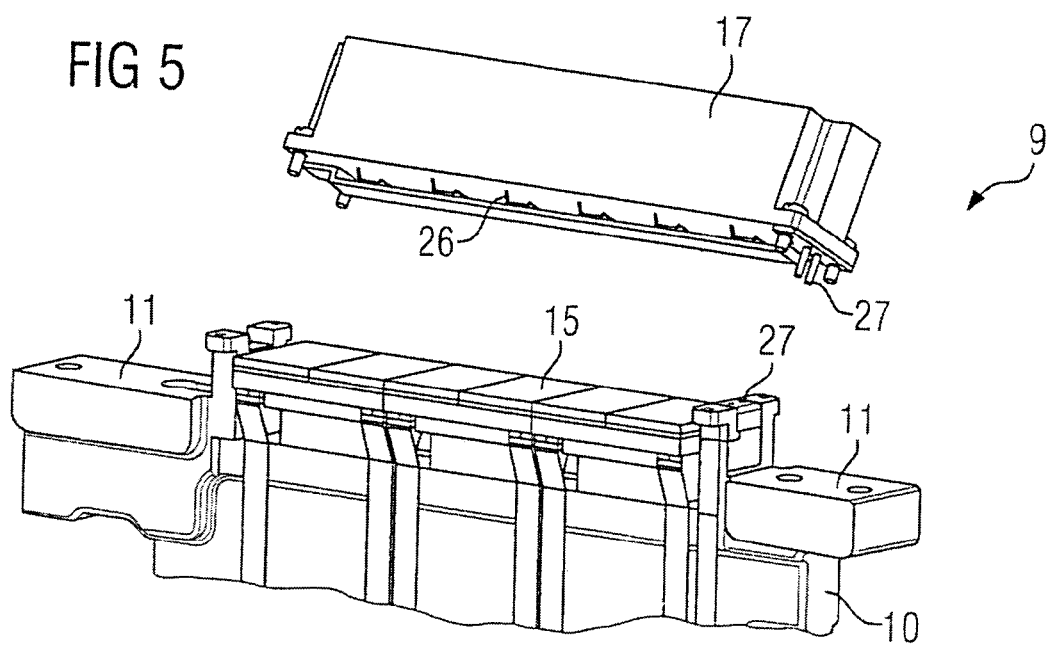
FIG. 5 shows a fourth configuration of a detector module according to the first aspect of an embodiment of the invention.

The fourth configuration as shown in FIG. 5 differs from the first to third configurations on the one hand in that spring elements 26 arranged on the scattered radiation collimator side are provided. The effect of the spring elements 26 is that the conductive rubber or the flat conductor 24 in particular, and the contact side 19 in general, are pressed onto the counter-electrodes 15. The spring elements 26 comprise suitably selected spring constants, so that the respectively required contact pressure is achieved. Preferably, but without restriction of generality, at least one spring element 26 is provided for each detector submodule 12. The number of spring elements 26 may however be varied as desired, inter alia as a function of the type and stiffness of the respective insulator layer 21 and/or conducting layer 22.

On the other hand, the fourth configuration differs from the first to third configurations in that electrical contacting between the voltage supply 20 and the contacting unit 16 is achieved by way of plug-in connectors 27, specifically by way of contact pins and corresponding plug-in holes. The contact pins may also be used as positioning aids for mounting the scattered radiation collimator 17 relative to the support 10.

Figure 6:
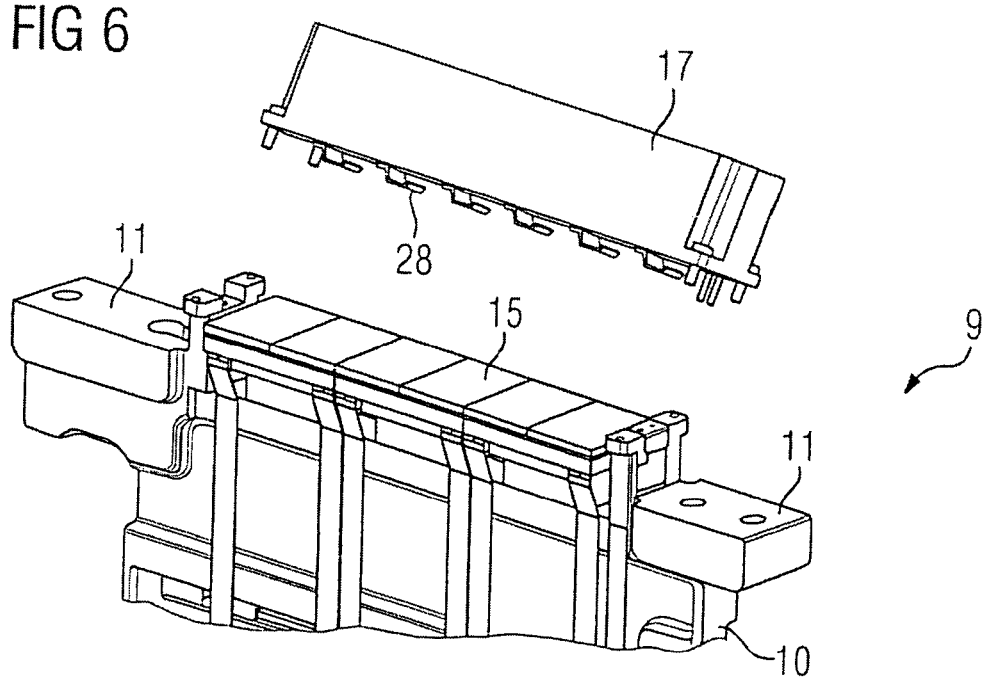
FIG. 6 shows a fifth configuration of a detector module according to the first aspect of an embodiment of the invention.

FIG. 6 shows a configuration of the detector module 9. In the fifth configuration, the contacting unit 16 includes resilient contact tabs 28 electrically conductively connected to one another. The contact tabs 28 are fitted on the scattered radiation collimator 17 and project from the lower side thereof in the direction of the detector submodules 12, or counter-electrodes 15. So that the scattered radiation collimator 17 or other components are insulated from the contact tabs 28, an insulation layer may be provided between the contact tabs 28 and the scattered radiation collimator 17. As in the fourth configuration, electrical contacting of the contact tabs 28 is carried out by means of contact pins and corresponding plug-in holes.

When the scattered radiation collimator 17 is being mounted, the contact tabs 28 are pressed onto the counter-electrodes 15. Owing to the resilient properties of the contact tabs 28, essentially consistent-quality contacting can readily be achieved for all the counter-electrodes 15. Preferably, precisely one contact tab 28 is provided for each counter-electrode 15 and is approximately arranged centrally with respect to the contact surface of the counter-electrode 15. It is also possible to provide more contact tabs 28 per counter-electrode 15. As an alternative to this, it is also possible for a bearing surface of a contact tab 28 to be in contact with two counter-electrodes 15, for example in the region of adjacent edges.

Further alternative configurations of the contacting unit are conceivable in the scope of the invention. In particular, combinations of the first to fifth configurations may be envisaged.

In particular with the aid of the example embodiments, it is clear that simple contacting of the detector submodules 12 can be carried out with the detector module 9 according to at least one embodiment of the invention. The contacting may be made with essentially consistent quality for all the detector submodules 12. Furthermore it is possible to replace a faulty detector submodule 12 or other components, for example ones placed below the detector submodules 12, without great outlay and without damaging the detector module 9.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDS; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A detector module for producing a directly converting radiation detector for the detection of radiation, comprising:
    a plurality of successively arranged detector submodules, each including a multiplicity of detector pixels, each detector submodule including a multiplicity of pixel electrodes on a first side of the detector module and respectively including a counter-electrode on a second side opposite to the first side;
    a scattered radiation collimator fitted facing the counter-electrodes and spanning the successively arranged detector submodules in the manner of a bridge; and
    a contacting unit, inserted between the scattered radiation collimator and the counter-electrodes and electrically connected to at least one voltage-supplying contacting site, the contacting unit being provided and designed so that at least one contact connection is established between the contacting unit and the counter-electrodes by way of assembly-related proximity of the scattered radiation collimator and the counter-electrodes.

2. The detector module as claimed in claim 1, wherein at least one contacting site is provided, and wherein at least one of contact pins, plug-in contacts and contact surfaces are provided to establish an electrical contact with the contacting unit.

3. The detector module as claimed in claim 2, wherein the contacting unit includes a contacting layer which is electrically conductive at least on the counter-electrode side and is pressed onto the counter-electrodes by way of the scattered radiation collimator.

4. The detector module as claimed in claim 1, wherein the contacting unit includes a contacting layer which is electrically conductive at least on the counter-electrode side and is pressed onto the counter-electrodes by way of the scattered radiation collimator.

5. The detector module as claimed in claim 4, wherein the contacting layer includes a contacting substrate designed electrically conductively at least on the counter-electrode side.

6. The detector module as claimed in claim 5, wherein the contacting substrate includes a substrate layer made of an electrical insulating material on the collimator side.

7. The detector module as claimed in claim 6, wherein the insulating material is provided in the form of a foam.

8. The detector module as claimed in claim 4, wherein the contacting layer is made of an electrical insulating material filled with conductive particles.

9. The detector module as claimed in claim 8, wherein the insulating material is made of a polymer.

10. The detector module as claimed in claim 9, wherein the layerinsulating material is made of at least one of plastic and a latex material.

11. The detector module as claimed in claim 1, wherein the contacting unit is applied onto the side of the scattered radiation collimator facing the counter-electrodes, or is fitted or fastened thereon.

12. The detector module as claimed claim 1, wherein at least one pressing element producing a contact pressure is provided, by which the contacting unit is pressed onto the counter-electrodes.

13. The detector module as claimed in claim 12, wherein the pressing element is designed so that the contact pressure is produced by way of a spring force.

14. The detector module as claimed in claim 13, wherein the pressing element includes a spring element fitted on the counter-electrode side of the scattered radiation collimator.

15. The detector module as claimed in claim 1, wherein the contacting unit includes a number of resilient contact tabs corresponding in number at least to the counter-electrodes, which project in the direction of the counter-electrodes, the contact tabs being pressed onto respectively assigned counter-electrodes by way of the assembly-related proximity of the scattered radiation collimator and the counter-electrodes.

16. A radiation detector comprising at least one detector module as claimed in claim 1.

17. A radiation recording device, comprising at least one radiation detector as claimed in claim 16.

18. An X-ray computer tomography device, comprising at least one radiation detector as claimed in claim 16.

19. The detector module as claimed in claim 1, wherein detector module is for producing a directly converting radiation detector for the detection of at least one of X-radiation and gamma radiation.

20. A detector module for producing a directly converting radiation detector for the detection of radiation, comprising:
    a plurality of successively arranged detector submodules, each including a multiplicity of detector pixels, each detector submodule including a multiplicity of pixel electrodes on a first side of the detector module and respectively including a counter-electrode on a second side opposite to the first side;
    a scattered radiation collimator fitted facing the counter-electrodes and spanning the successively arranged detector submodules in the manner of a bridge;
    a contacting unit, arranged between the scattered radiation collimator and the counter-electrodes and electrically connected to at least one voltage-supplying contacting site; and
    a pressing device that produces a contact pressure by which the contacting unit is pressed onto the counter-electrodes.

* * * * *